United States Patent [19]

Kawamata

[11] Patent Number: 4,870,481
[45] Date of Patent: Sep. 26, 1989

[54] COLOR TELEVISION SIGNAL TRANSMISSION SYSTEM AND IMPROVED-DEFINITION RECEIVER FOR USE IN THE SYSTEM

[75] Inventor: Seiji Kawamata, Kawasaki, Japan
[73] Assignee: Ikegami Tsushiniki Co., Ltd., Tokyo, Japan
[21] Appl. No.: 127,260
[22] Filed: Dec. 1, 1987
[51] Int. Cl.⁴ .................. H04N 9/78; H04N 11/14
[52] U.S. Cl. .................................... 358/31; 358/23
[58] Field of Search ............... 358/12, 13, 16, 21 R, 358/31, 39, 23, 7

[56] References Cited

U.S. PATENT DOCUMENTS 4,598,309  7/1986  Casey ................................. 358/31
4,742,386  5/1988  Wilkinson ......................... 358/13

Primary Examiner—Tommy P. Chin
Attorney, Agent, or Firm—Spencer & Frank

[57] ABSTRACT

A color television signal transmission system in which, at the transmitter end the frequency bandwidths of the brightness and chrominance signals are extended by two to three times as compared with the NTSC system to improve horizontal resolution and color reproducibility. At the receiver end, the received composite signal is subjected to both interframe separation and picture adaptive separation to provide two brightness signals and two chrominance signals. A combined brightness signal is formed by adding the two brightness signals after they have been multiplied by weights which are determined on the basis of picture movement, and a combined chrominance signal is formed in the same way. The combined brightness and chrominance signals are converted into red, green and blue color signals, and then the vertical resolution is improved by movement adaptive line interpolation. The transmission system has vertical resolution and horizontal resolution superior to the NTSC, IDTV, and EDTV systems, and furthermore can be realized by simpler and cheaper equipment than the HDTV system.

14 Claims, 9 Drawing Sheets

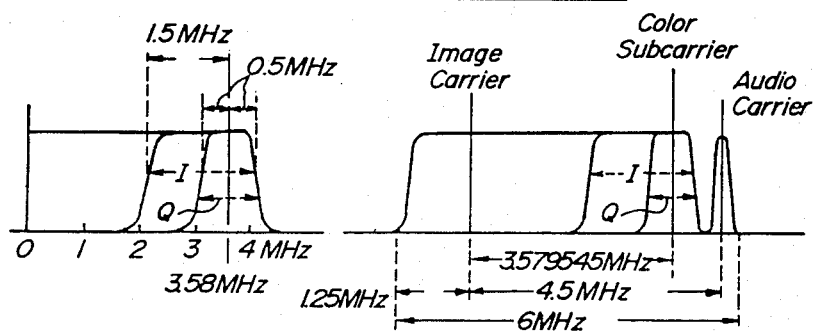
FIG_1A
PRIOR ART
FIG_1B
PRIOR ART
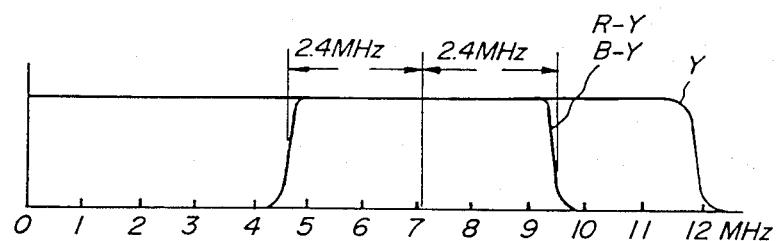
FIG_2A
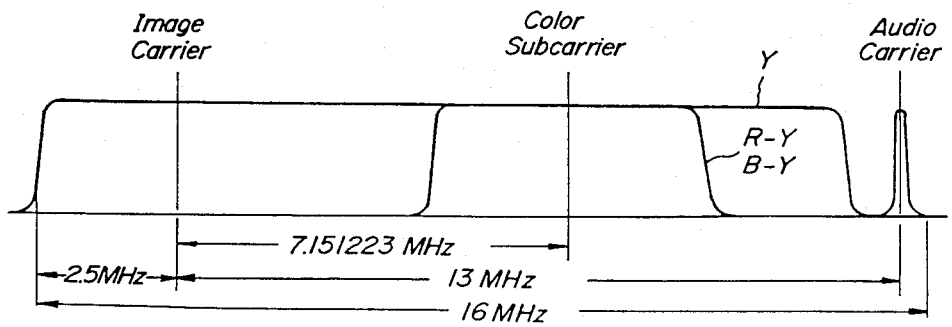
FIG_2B

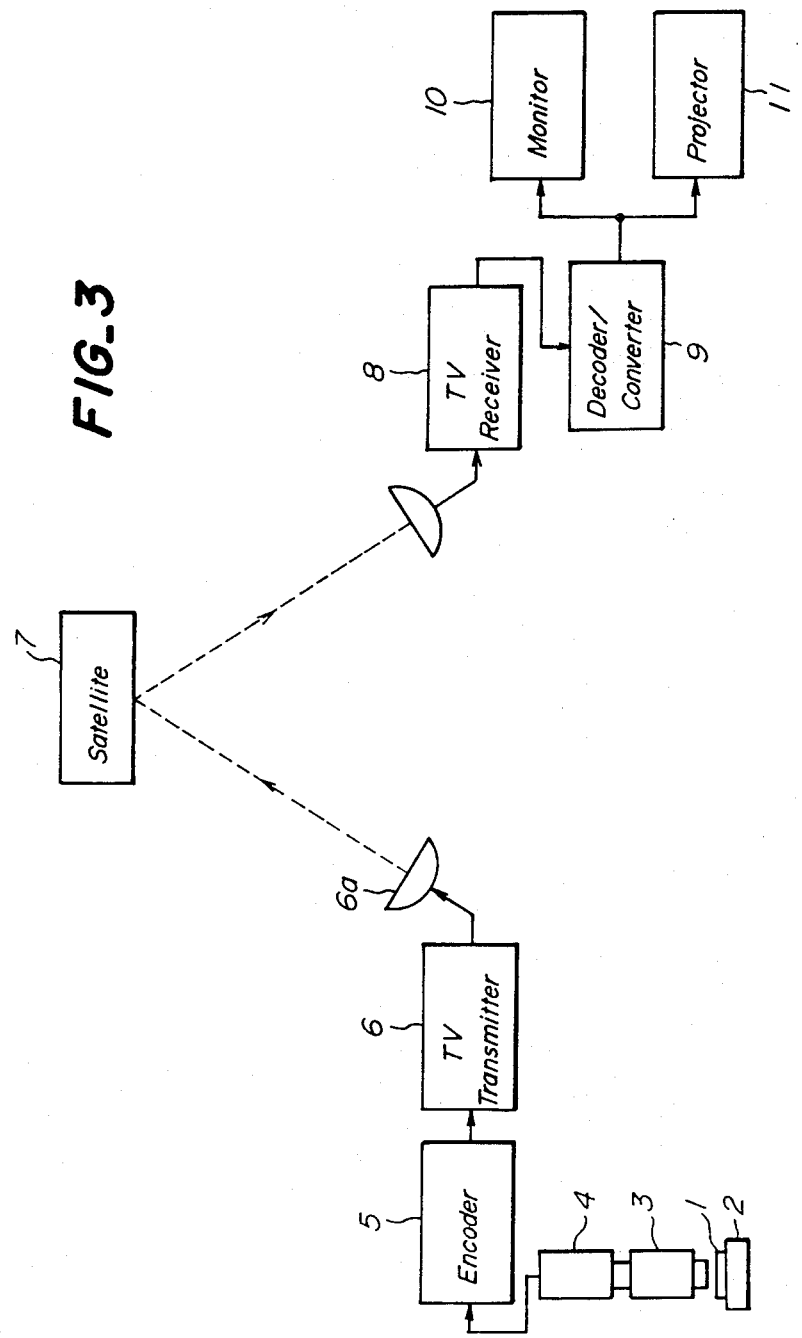

FIG_6
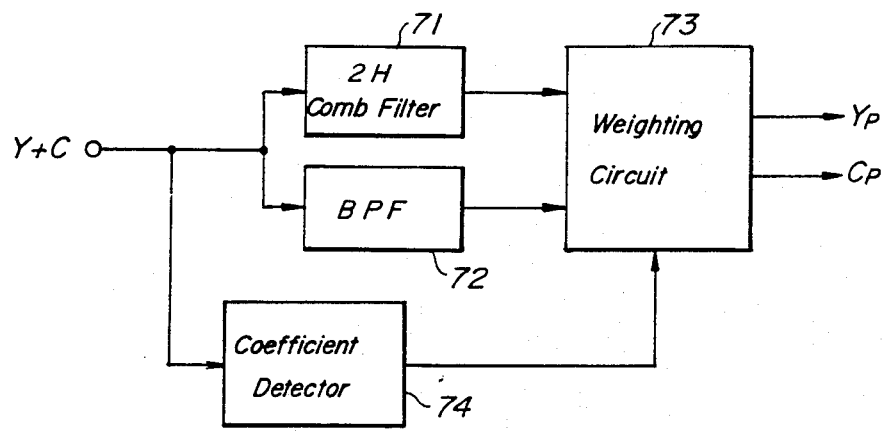
FIG_7
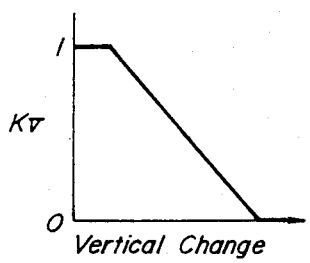
FIG_8
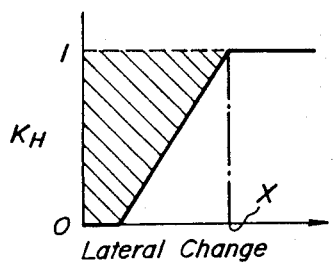

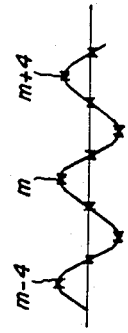
FIG._11
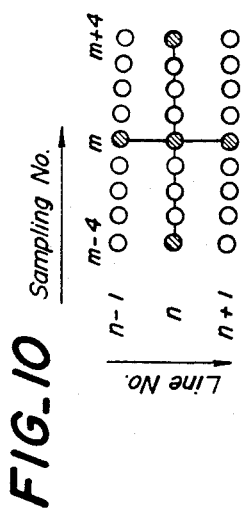
FIG._10
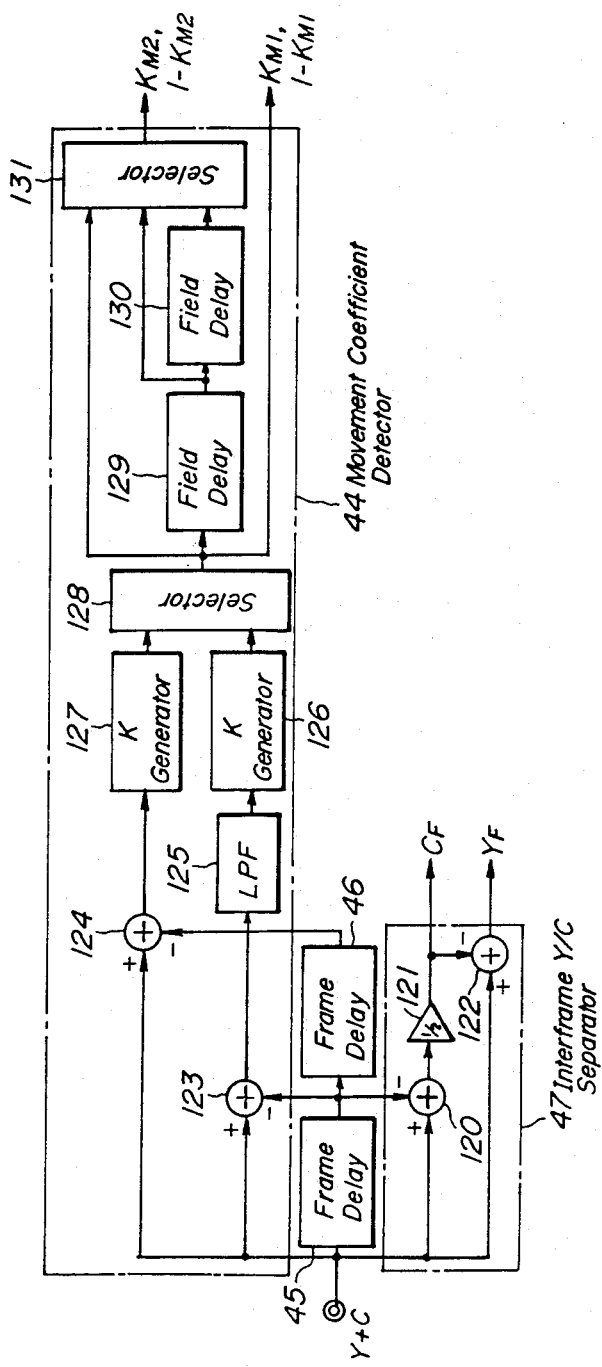
FIG._12

FIG_13
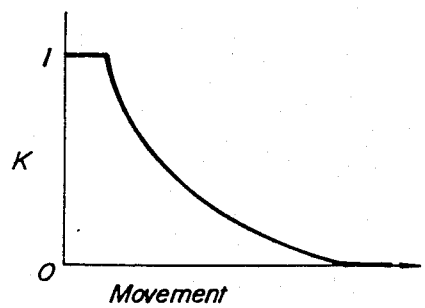
FIG_14
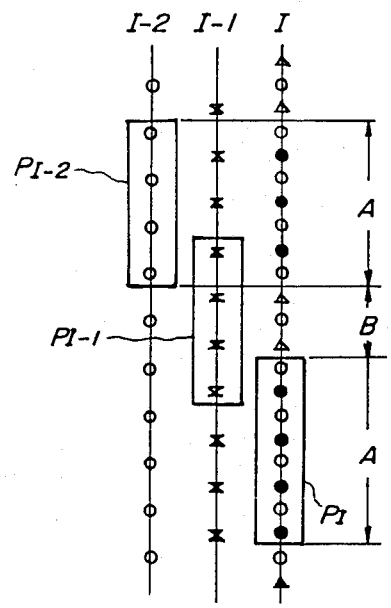

COLOR TELEVISION SIGNAL TRANSMISSION SYSTEM AND IMPROVED-DEFINITION RECEIVER FOR USE IN THE SYSTEM

BACKGROUND OF THE INVENTION

The present invention relates to a color television signal transmission system, and more particularly to a color television signal transmission system which has resolution and color reproducibility superior to those of the Improved Definition Television system (IDTV) and Extended Definition Television system and which can be realized in a less expensive manner than the High Definition Television system (HDTV). The present invention also relates to a receiver for use in the above mentioned color television signal transmission system.

The color television standard system used in Japan and in the United Stated of America is called the NTSC system. In the NTSC system, the color television signal is a composite signal comprising a brightness signal a chrominance signal, synchronizing signals, and an audio signal, and is compatible with a black and white television signal. As shown in FIGS. 1A and 1B, the frequency bandwidth of the NTSC composite signal, including the audio signal, is limited to 6 MHz, and the frequency bandwidths of the brightness and chrominance signals are limited to 4.25 MHz and 2 MHz, respectively. Therefore, the resolution in the horizontal and vertical directions is restricted to 300 lines. Such a resolution would be satisfactory for domestic purposes, but would not be sufficient for medical and some industrial purposes. Further, due to the fact that the chrominance signal does not have a sufficiently wide bandwidth, the color reproducibility is poor. For medical purposes, microscopic images of blood, bacteria, and cells, and various other kinds of medical images such as images of the bodies of patients during surgery, X-ray images, and ultrasonic images most be transmitted with high resolution and reproducibility. The transmission of such medical images may be required when district medical organizations distributed over the country, or doctors on ships, want to seek suggestions about patients from experienced doctors located at a central medical organization. For such a purpose, vertical and horizontal resolution up to 400 and 750 lines, respectively, must be attained and the color reproducibility should be higher than that of the NTSC system.

Nippon Hoso Kyokai (NHK) in Japan has developed a High Definition Television (HDTV) system called the MUSE system. This HDTV system utilizes the multiple sampling technique and has a very wide frequency bandwidth of 27 MHz. This system can attain the high vertical and horizontal resolution up to 800 lines, and extremely superior color reproducibility can also be achieved. This system can sufficiently satisfy the above mentioned requirement for the medical purpose. However, not only the transmitter, but also the receiver, are very complicated in construction, large in size, and expensive in cost. Further, the resolution of the HDTV system is unnecessarily higher than that required for the above explained purposes. Moreover, in the HDTV system almost none of the equipment in either the transmitter or the receiver of the existing NTSC system could be used.

Some color television signal transmission systems have been developed which are compatible with the NTSC system and have higher resolution than the NTSC system. For instance, the EDTV and IDTV systems have been proposed. In the IDTV system the transmitter transmits the same signal as that of the existing NTSC system, and in the receiver the interlaced signal is converted into a non-interlaced signal by using interpolation, so that the vertical resolution is increased. In the EDTV system, the interlaced signal is converted into a non-interlaced signal as in the IDTV system, and further high frequency components of the brightness signal are interlaced with low frequency components of brightness signal and the chrominance signal so that the horizontal resolution is improved. However, in these known IDTV and EDTV systems, the vertical and horizontal resolution are 450 and 400 lines, respectively, which do not satisfy the necessary resolutions of medical images. Further, the color reproducibility of the IDTV and EDTV systems is too low to reproduce medical images satisfactorily, because the frequency bandwidth of the chrominance signal is restricted.

As explained above, the known color television systems do not satisfy the requirements mentioned above, and thus it would be desirable to develop a new color television signal transmission system which has horizontal and vertical resolution up to 750 and 400 lines, respectively, and color reproducibility superior to that of the NTSC system.

SUMMARY OF THE INVENTION

The present invention has for its object to provide a novel and useful system for transmitting a color television signal, in which the resolution and color reproducibility are superior to those of the NTSC, EDTV and IDTV systems, and the construction of the transmitter and receiver can be made much simpler and cheaper than the the HDTV system.

According to the invention, a system for transmitting a movable picture via a color television signal comprises;

at a transmitter end first means, responsive to red, green and blue input color signals, for generating a composite color television signal including a brightness signal modulated on a main carried and having a frequency bandwidth of 8 to 15 MHz, and a chrominance signal modulated on a color subcarrier and having a frequency bandwidth of 1.8 to 3.5 MHz, said chrominance signal being interleaved with the brightness signal; and second means for transmitting the composite color television signal; and at a receiver end third means, responsive to the signal transmitted by the second means, for generating a received composite color television signal having a brightness component and a chrominance component;

forth means deriving from the received composite color television signal mutually separated first brightness and chrominance signals, the third frame including an interframe brightness/chrominance separator;

fifth means for deriving from the received composite color television signal mutually separated second brightness and chrominance signals, the fifth means including an picture adaptive brightness/chrominance separator;

sixth means for deriving mutually separated for the brightness and chrominance signals by adding said mutually separated first and second brightness and chrominance signals, respectively, in accordance with a weight determined by the movement of the picture;

seventh means for effecting the contour enhancement of the further brightness signal to derive an enhanced brightness signal;

eight means for decoding the enhanced brightness signal and the further chrominance signal to derive red, green and blue color signals; and ninth means for generating interpolated signals to provide additional scanning lines by effecting movement adaptive line interpolation for the red, green and blue color signals the movement adaptive line interpolation reducing spurious after images when there is movement of the picture.

In the color television signal transmission system according to the invention, the transmitted composite color television signal is similar to that of the NTSC system except for the frequency bandwidth. In a preferred embodiment of the transmission system according to the invention, the number of scanning lines per frame of the transmitted signal is 525 lines/frame, the number of frames per second is 30 frames/second, and the interlace ratio of 2:1 is effected just as in the NTSC system. However the brightness signal Y has a frequency bandwidth of about 12 MHz (which is wider than the 4.2 MHz of the NTSC system by a factor of 2.86), one of the color difference signals (R−Y) has a frequency bandwidth of about 2.4 MHz (which is twice the 1.2 MHz of the NTSC system), the other color difference signal (B−Y) has a frequency bandwidth of about 2.4 MHz (which is four times broader than the 0.6 MHz of the NTSC system), and the color subcarrier is set to 7.151223 MHz (which is higher by about two times than the 3.579545 MHz of the NTSC system), said subcarrier frequency being equal to a half of an odd multiple of the horizontal scanning frequency of 15.734263 KHz. The color difference signals (R−Y) and (B−Y) are transmitted in the double-sideband mode and the brightness signal is transmitted in the residual sideband mode, the frequency bandwidth of the transmitted signal spectrum being 15.5 MHz. The audio signal is transmitted on an audio carrier in the same channel or may be transmitted over a different channel. When the audio signal is transmitted over the same channel, the frequency bandwidth of the composite video and audio signal amounts to about 16 MHz.

At the receiver end, in addition to a brightness/chrominance (Y/C) separation between successive frames, a picture adaptive Y/C separation is effected. The brightness and color signals obtained from these separations are added to each other in accordance with a weight which is determined by a movement coefficient. The separated brightness signal is subjected to contour enhancement. Then the brightness and chrominance signals are converted into red (R), green (G) and blue (B) signals. Finally, a scanning line interpolation procedure is carried out in the movement adaptive mode to derive a non-interlaced color television signal of 525 lines per frame and 60 frames per second or an interlaced color television signal of 1050 lines per frame and 30 frames per second.

BRIEF DESCRIPTION OF THE DRAWINGS

FIGS. 1A and 1B are spectrum diagrams showing the composite color television signal and the transmitted signal of the known NTSC system;

FIGS. 2A and 2B are spectrum diagrams illustrating the composite color television signal and transmitted signal of an embodiment of the color television signal transmission system according to the invention;

FIG. 3 is a block diagram depicting an embodiment of the color television signal transmission system according to the invention;

FIG. 6 is a block diagram depicting the construction of a picture adaptive Y/C separator;

FIGS. 7 and 8 show characteristics of vertical and lateral movement coefficient detectors;

FIG. 10 is a schematic view showing a positional relation between scanning lines and sampling points;

FIG. 11 is a schematic view depicting a positional relation between sampling points and the phase of the subcarrier;

FIG. 12 is a block diagram showing detailed construction of a movement coefficient detector;

FIG. 13 shows a characteristic of the movement coefficient detector;

FIG. 14 is a diagram for explaining how to detect the movement; and

DESCRIPTION OF THE PREFERRED EMBODIMENT

Figure 4:
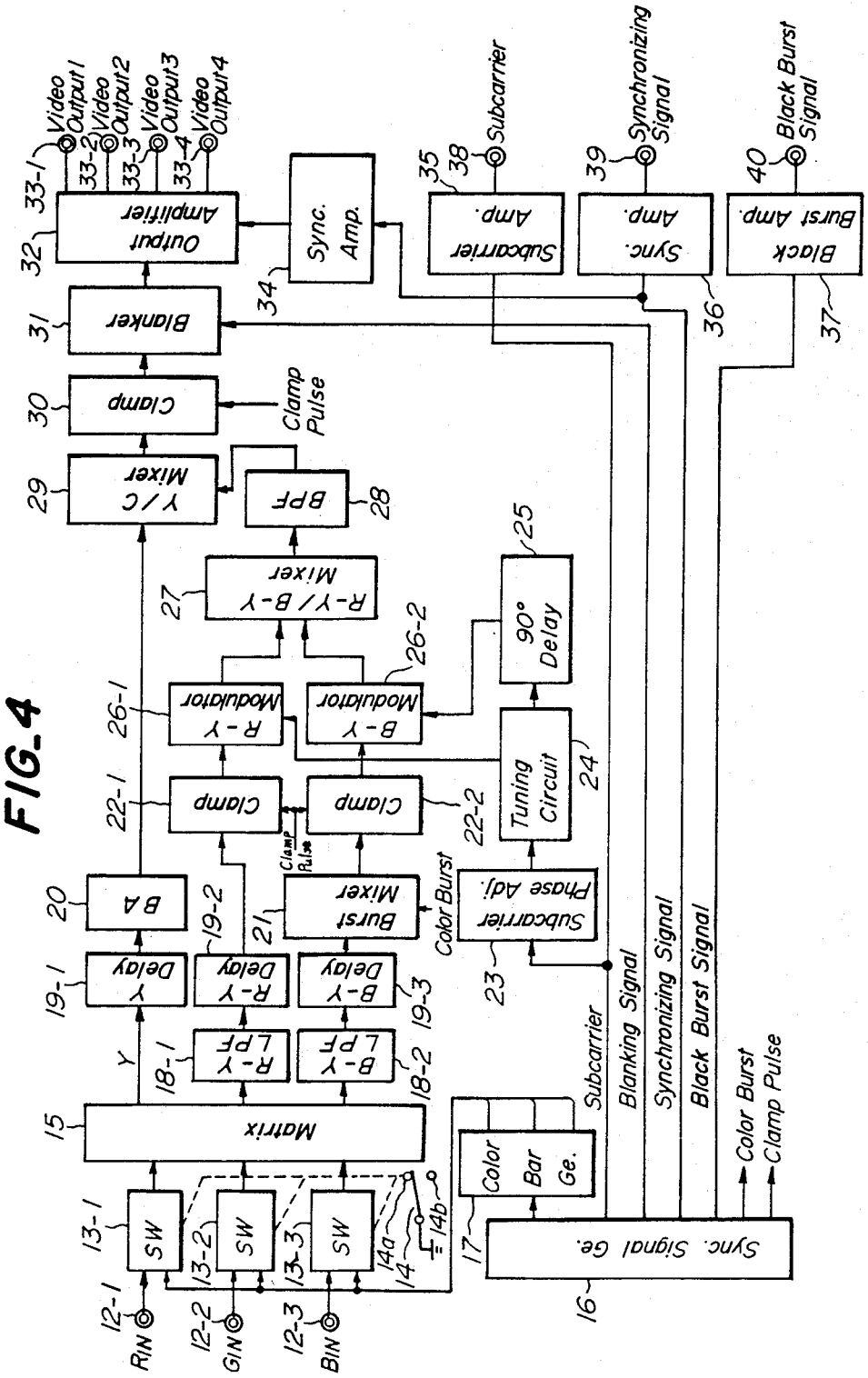
FIG. 4 is a block diagram showing the detailed construction of the encoder provided in the transmitter.

FIGS. 2A and 2B show spectrum diagrams of a composite color television signal and a transmission signal, respectively, in an embodiment of the color television signal transmission system according to the invention. In the present embodiment, the number of lines per frame of the transmission signal is set to 525, an interlace ratio of 2:1 is adopted, and the vertical and horizontal scanning frequencies are set to 59.94 Hz and 15.734263 KHz, respectively. These parameters are entirely same as those of the NTSC system. The color subcarrier frequency is set to 7.151223 MHz, which is equal to a half of an odd multiple of the horizontal scanning frequency, so that the brightness and chrominance signals are interlieved with each other. The frequency bandwidth of the brightness signal Y is set to about 12 MHz and the color difference signals (R−Y) and (B−Y) have a frequency bandwidth of 2.4 MHz and are transmitted in the double-sideband mode. In this manner, the brightness and chrominance signals have wider frequency bandwidths than those of the NTSC system, so that the horizontal resolution and color reproducibility can be improved materially. It should be noted that the present invention is not limited to the above mentioned numerical values, but may be modified in various ways. The inventor has confirmed that the frequency bandwidth of the brightness signal Y should be set to a value within a range from 8 MHz to 15 MHz. If the bandwidth of the brightness signal Y is set to a value lower than 8 MHz, the color reproducibility might deteriorate, and if the bandwidth is set to a value higher than 15 MHz, it is no longer possible to utilize existing television cameras which have been developed for the NTSC system, and the transmission system according to the invention could no longer be carried out economically.

Further, the frequency bandwidth of the chrominance signal C (R−Y and B−Y) has to be set to a value within a range from 1.8 MHz to 3.5 MHz. If the chrominance signal has a bandwidth lower than 1.8 MHz, the color reproducibility might be decreased to an inadmissible extent. Further, the bandwidth of the chrominance signal should not exceed twice of the color subcarrier frequency.

As shown in FIG. 2B, the transmission signal is a composite signal of the image signal and the audio signal and has a total transmission frequency bandwidth of about 16 MHz. However, the audio signal may be transmitted over a separate channel. When the composite signal is transmitted, the audio carrier should be separated from the brightness signal by more than about 1 MHz.

FIG. 3 is a block diagram illustrating an embodiment of the color television signal transmission system according to the invention. In the present embodiment, use is made of a satellite for transmitting microscopic images. The communication link via the satellite has a frequency bandwidth of 24 MHz, which is sufficiently wide for transmitting a color television signal having a frequency bandwidth of 16 MHz. It should be noted that the color television signal may be transmitted over a video channel having a frequency bandwidth up to 16 MHz by utilizing microwave links and cable links provided on the ground. In FIG. 3, reference numeral 1 denotes a sample whose microscopic image to be transmitted. The sample 1 is placed on a stage 2. A microscopic image of the sample 1 is formed by a microscope 3 on which is arranged a color television camera 4 for picking up the microscopic image and producing color signals R, G and B. The color television camera 4 should have a frequency characteristic such that the signal gain does not decrease by more than 3 db over the frequency range of 12 MHz. Such a color television camera can be easily found among various cameras developed for the NTSC system. For instance, the color television camera of Type HK-322, manufactured by Ikegami Tsushinki Co., Ltd., Japan, may be utilized for the present transmission system. The color signals R, G and B are supplied to a color encoder 5 which forms the composite color television signal shown in FIG. 2A mentioned above. The color composite signal thus formed is supplied to a television signal transmitter 6 which forms the transmission signal illustrated in FIG. 2B and transmits the signal via a transmitting antenna 6a toward a satellite 7. The satellite 7 emits the signal toward a receiving antenna provided at the receiver end. The received transmission signal is supplied to a television signal receiver 8 which reproduces the composite color television signal shown in FIG. 2A. The reproduced composite color television signal is supplied to a decoder/converter 9 which converts the composite color television signal into color signals R, G and B by effecting Y/C separation, contour enhancement and picture adaptive line interpolation. The color signals R, G and B thus produced are supplied to a color monitor 10 and a color projector 11 to display a color image having high resolution and improved color reproducibility.

FIG. 4 is a block diagram showing an embodiment of the color encoder 5. The basic construction of the encoder 5 is identical with the known color encoder of the NTSC system, so that the construction of the encoder will be explained briefly. The encoder receives the input color signals $R_{IN}$, $G_{IN}$ and $B_{IN}$ at input terminals 12-1, 12-2 and 12-3, respectively. The encoder comprises switches 13-1, 13-2 and 13-3 for selecting either the received color signals $R_{IN}$, $G_{IN}$ and $B_{IN}$ or a set of color bar signals supplied from a color bar generator 17 which is controlled by a synchronizing signal generator 16. When a switch 14 is switched to a camera contact 14a, the input color signals $R_{IN}$, $G_{IN}$ and $B_{IN}$ are selected and when the switch 14 is changed over to a color bar contact 14b, the color bar signals are selected. The selected color signals are then supplied to a matrix 15 which generates a brightness signal Y and color difference signals R−Y and B−Y. The brightness signal is supplied to a mixer 29 by means of delay 19-1 and buffer amplifier 20. The color difference signals R−Y and B−Y are supplied through low pass filters 18-1 and 18-2 to delays 19-2 and 19-3, respectively. The delayed R−Y signal is supplied via a clamp circuit 22-1 to a modulator 26-1, and the delayed B−Y signal is supplied to a burst mixer 21 and is mixed with a color burst signal supplied from the synchronizing signal generator 16. The B−Y signal having the color burst added thereto is supplied via a clamp circuit 22-2 to a B−Y modulator 26-2. A color subcarrier generated by the synchronizing signal generator 16 is supplied to a phase adjuster 23 for adjusting the phase of subcarrier over 360° and then is supplied to a tuning circuit 24 for removing distortion in the subcarrier which might be produced by the phase adjustment. A non-delayed subcarrier is supplied to the R−Y modulator 26-1 and the subcarrier delayed by 90° (in a 90° delay 25) is supplied to the B−Y modulator 26-2 to modulate the subcarriers in accordance with the R−Y and B−Y signals, respectively. The output signals from the modulators 26-1 and 26-2 are mixed by a mixer 27 and the mixed signal is supplied to the Y/C mixer 29 by means of a band pass filter 28. The brightness and chrominance signal mixed by the mixer 29 is supplied via clamp circuit 30 and blanker 31 to an output amplifier 32. Clamp circuit 30 is also supplied with a clamp pulse from the synchronizing signal generator 16, and a blanking pulse generated by the circuit 16 is supplied to the blanker 31. Synchronizing signals generated by the circuit 16 are supplied to the output amplifier 32 through a synchronizing signal amplifier 31. Then the output amplifier 32 generates video output signals at output terminals 33-1 to 33-4. Further, the color subcarrier, synchronizing signals and black burst signal from the synchronizing signal generator 16 are supplied to output terminals 38, 39 and 40 via amplifiers 35, 36 and 37, respectively to provide the subcarrier, synchronizing signals and the black burst signal at the output terminals 38, 39 and 40, respectively.

Now the detailed construction at the receiver end will be explained, with initial reference to FIG. 5. At the receiver end, the vertical resolution is improved and the interlaced signal is converted into a non-interlaced signal. The input composite color television signal Y+C is supplied from an input terminal 41 to a low pass filter 42 having a cut-off frequency of 12 MHz, and then is converted into a digital signal by means of an analog-/digital converter 43. The digital signal is then parallelly supplied to movement coefficient detector 44, frame delay 45, interframe Y/C separator 47 and picture adaptive Y/C separator 48. The picture adaptive Y/C separator 48 produces separated brightness and chrominance signals $Y_P$ and $C_P$ corresponding to portions in an image which show vertical and horizontal changes. The operation of this Y/C separator 48 will be explained in detail hereinafter. A one frame delayed signal and nondelayed signal are supplied to the interframe Y/C separator 47 to derive separated brightness and chrominance signals $Y_F$ and $C_F$ by utilizing the fact that the phase of the chrominance signal changes for successive frames. The output signals $Y_F$ and $Y_P$ and the output signals $C_F$ and $C_P$ are combined, via multipliers 49, 51 and 50, 52 by adders 53 and 54, respectively in such a manner that when the movement in the picture is large, a weight for the output signals from the picture adaptive Y/C separator 48 becomes large, and when the movement is small, a weight for the output signals from the interframe Y/C separator 47 becomes large. To this end, the movement coefficient detector 44 detects the degree of movement in the picture contents and generates a weight coefficient $K_{M1}$ which becomes larger when the movement becomes smaller. The movement coefficient $K_{M1}$ thus generated is supplied to the multipliers 49–52 and multiplied signals are added to each other in the adders 53 and 54. That is to say, the separated brightness signal Y and chrominance signal C are expressed by the following equations.

$$Y = K_{M1} Y_F + (1 - K_{M1}) Y_P$$

$$C = K_{M1} C_F + (1 - K_{M1}) C_P$$

Next, the picture adaptive separation will be explained. FIG. 6 is a block diagram showing the basic construction of the picture adaptive Y/C separator 48. The input composite color television signal Y+C is supplied to a 2H comb filter 71 (H denotes a horizontal line period) and a band pass filter 72. The 2H comb filter 71 might produce dot crawl in dependence upon the picture content of the image and undesired enhancement for portions showing lateral movement, i.e. discontinuous portions. The band pass filter 72 has the disadvantage that the resolution is decreased due to the lack of the brightness component near the color subcarrier and the undesired cross color might be produced due to the fact that the brightness components might be leaked into the chrominance components. However band pass filter 72 the advantage that the above mentioned dot crawl and lateral enhancement do not occur. According to the present invention, the separated brightness and chrominance signals supplied from the 2H comb filter 71 and band pass filter 72 are combined in a weighting circuit 73 in accordance with a weight which is dependent upon the movement of picture in such a manner that a weight for the output signals from the 2H comb filter 71 becomes large for portions in the picture which show little movement, and a weight for the output signals from the band pass filter 72 becomes large for portions showing a large movement.

In the present embodiment, at first vertical and lateral change coefficients $K_V$ and $K_H$ are derived, and then the largest coefficient is supplied to the weighting circuit 73 as the coefficient for representing the degree of change in the picture. The vertical change coefficient $K_V$ is calculated in the following manner. At first absolute values of differences in the brightness signal between a line and upper and lower lines are derived, and the larger absolute value is selected as the vertical change. Then the change coefficient $K_V$ is determined in accordance with a characteristic shown in FIG. 7. Generally speaking, the coefficient $K_V$ is inversely proportional to the vertical change. The lateral change coefficient $K_H$ is determined as illustrated in FIG. 8, in which the lateral change is proportional to the absolute value of the difference between a middle value and an average of levels at points situating on both sides of the middle point and having the same phase of the color subcarrier. As shown in FIGS. 7 and 8, when the vertical change and lateral change are small, the change coefficients $K_V$ and $K_H$ are set to 1 and 0, respectively. When $K_V$ is determined in manner explained above, the dot crawl can be effectively reduced, because when the vertical change increases, the coefficient $K_V$ becomes smaller. In a range of $K_V = 0$, only the output signal from the band pass filter 72 is generated from the weighting circuit 73, and in the range of $K_V = 1$, only the output data from the comb filter 71 is selected. By determining the lateral change coefficient $K_H$ in the manner explained above, the following merit can be attained. When the signal on a scanning line changes only slightly or changes in the same direction at a substantially constant rate, $K_H$ becomes zero or a very small value, so that the area denoted by hatching in FIG. 8 is improved as compared with the case in which only the output from the comb filter is selected. That is to say, when K is always set to 1, the vertical line in a picture might be thickened and multiple images of the vertical line appear. Contrary to this, in the present embodiment, since K is smaller than 1 in a region of lateral change smaller than X, the undesired enhancement of the vertical line can be mitigated.

Figure 9:
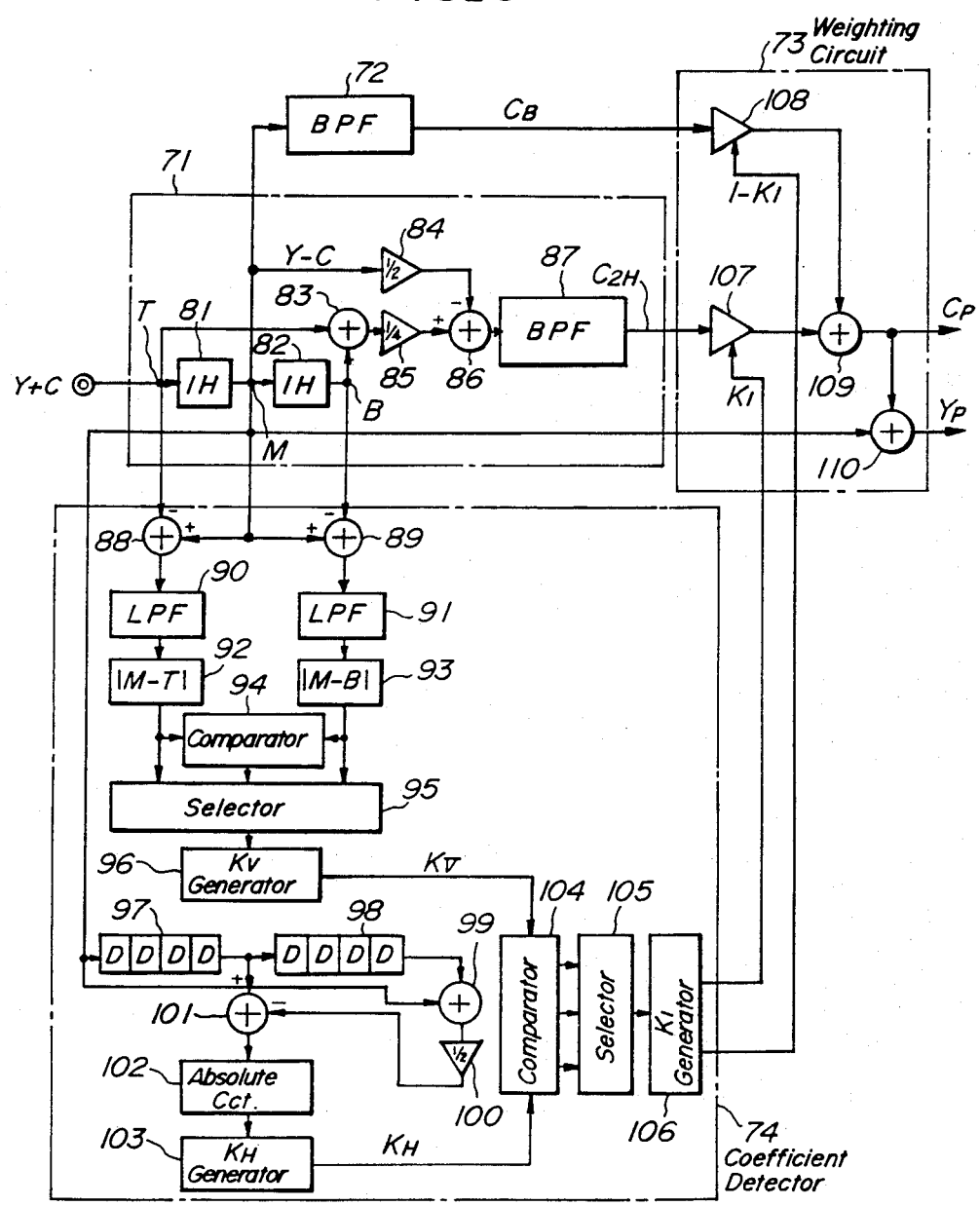
FIG. 9 is a block diagram illustrating the detailed construction of the picture adaptive Y/C separator.

FIG. 9 is a block diagram illustrating the detailed construction of the picture adaptive Y/C separator 48 according to the invention. The input composite color television signal Y+C is delayed in 1H delays 81 and 82 by one horizontal scanning period H successively. Therefore, at input point T, middle point M and output point B three successive lines (n+1), n and (n−1) respectively appear. In successive lines, the phase of the chrominance signal is in opposition to each other, so that when the (n+1) and (n−1) line signals appearing at the points T and B are added to each other by an adder 83 and the gain of the output signal from the adder 83 is reduced by four times in an amplifier 85, there is obtained a signal $\frac{1}{2}(Y+C)$ from the amplifier 85. The n line signal at the point M is amplified by an amplifier 84 by a half to derive an output signal $\frac{1}{2}(Y−C)$. Then a difference between the signals $\frac{1}{2}(Y+C)$ and $\frac{1}{2}(Y−C)$ is derived by a subtracter 86 and the output signal from the subtracter 86 is passed through a band pass filter 87 to derive a chrominance signal $C_{2H}$. The signal (Y−C) at the middle point M is passed through the band pass filter 72 to derive the chrominance signal $C_B$.

In order to derive the vertical change coefficient $K_V$, the difference between signals at the points M and T and the difference between the points M and B are derived by subtracters 88 and 89, respectively, and then the differences thus derived are supplied to low pass filters 90 and 91, respectively to delete the chrominance component. In this manner, there are obtained the two differences in the brightness signal Y. These differences are then supplied to absolute valve circuits 92 and 93 to derive absolute values of the differences which are then compared with each other in a comparator 94. The comparator 94 supplies a control signal to a selector 95 such that the selector selects the larger absolute value. The larger absolute value selected by the selector 95 is supplied to a $K_V$ generator 96. This generator 96 has the characteristic shown in FIG. 7 and produces the vertical change coefficient $K_V$.

Next, the manner of deriving the lateral change coefficient $K_H$ will be explained, with reference also to FIGS. 10 and 11. At first, the signal on $n^{th}$ line is sampled at a frequency higher than the color subcarrier frequency $f_{sc}$ by four times, i.e. $4f_{sc}$. A central sample m is compared with preceding and succeeding samples $m-4$ and $m+4$, respectively. This means that signals at positions having the same phase of the color subcarrier are compared with each other. To this end, the signal at the point M is supplied to delay circuits 97 and 98, each being composed of four delay elements and each delay element having a delay time equal to a period (about 70 n seconds) of the sampling signal of $4f_{sc}$. Then sampled signals $(m+4)$ and $(m-4)$ are added in an adder 99 and one half of the output signal of the adder 99 is provide by an amplifier 100 to derive a signal $(Y-C)$. The signal at the middle point M is also $(Y-C)$, and the difference between these $(Y-C)$ signals is derived by a subtracter 101. The output of the subtracter 101 represents the sum of a difference in the brightness signal Y and a difference in the chrominance signal C. This sum signal is then supplied to an absolute value circuit 102 to derive the absolute value thereof. This absolute value represents the amount of the lateral change and is supplied to a $K_H$ generator 103. The generator 103 generates the lateral change coefficient $K_H$ in accordance with the characteristic illustrated in FIG. 8.

The vertical and lateral change coefficients $K_V$ and $K_H$ are compared with each other in a comparator 104 and the larger coefficient is selected by a selector 105. The selected change coefficient $K_V$ or $K_H$ is supplied to a $K_1$ generator 106 as a control signal and the generator produces coefficients $K_1$ and $(1-K_1)$. These coefficients $K_1$ and $(1-K_1)$ are supplied to multipliers 107 and 108, respectively to which the chrominance signals $C_{2H}$ and $C_B$ are also supplied, respectively. Output signals from the multipliers 107 and 108 are added to each other in an adder 109 to derive the picture adaptive chrominance signal $C_P$. This signal $C_P$ is also added to the $(Y-C)$ signal at the middle point M in an adder 110 to generate the picture adaptive brightness signal $Y_P$.

Figure 5:
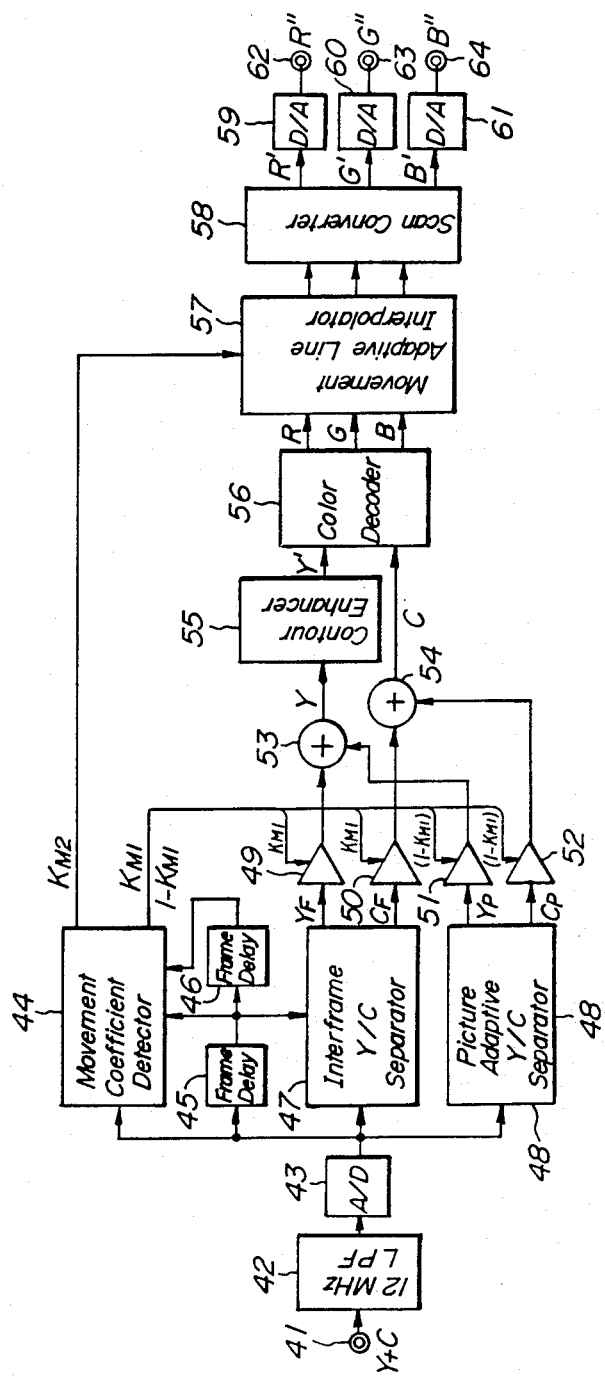
FIG. 5 is a block diagram illustrating the entire construction of the decoder and converter of the receiver.

The interframe Y/C separator 47 shown in FIG. 5 may be realized by a known circuit as shown in FIG. 12. Since the phases of the chrominance signal of successive frames are in opposition to each other, when the difference between signals the input and output terminals of a frame delay 45 is derived by a subtracter 120, there is obtained a signal $2C_F$. This signal is then amplified by an amplifier 121 by a factor of one half to obtain the chrominance signal $C_F$. The brightness signal $Y_F$ is derived by subtracting $C_F$ from the signal $Y+C$ at the input terminal of the frame delay 45 in a subtracter 122.

The picture adaptive brightness and chrominance signals $Y_P$ and $C_P$ and the interframe brightness and chrominance signals $Y_F$ and $C_F$ are added in accordance with the weight $K_{M1}$ produced by the movement coefficient detector 44 as illustrated in FIG. 5. That is to say, the signals $Y_F$ and $C_F$ are supplied to the multipliers 49 and 50, respectively to which is also supplied the weight $K_{M1}$ to produce signals $K_{M1}Y_F$ and $K_{M1}C_F$. Similarly the signals $Y_P$ and $C_P$ are supplied to the multipliers 51 and 52, respectively to which is also supplied the weight $(1-K_{M1})$ to derive signals $(1-K_{M1})Y_P$ and $(1-K_{M1})C_P$. Then the signals $K_{M1}Y_F$ and $(1-K_{M1})Y_P$ are added in the adder 53 to generate the separated brightness signal Y and the signals $K_{M1}C_F$ and $(1-K_{M1})C_P$ are added in the adder 54 to derive the separated chrominance signal C.

Next the manner of detecting the movement coefficient $K_{M1}$ will be explained. The chrominance signals at the input terminal of the frame delay 45 and the output terminal of the frame delay 46 shown in FIG. 12 have the same phase, so that when the difference between these signals is derived by a subtracter 124, it is possible to detect the change of the brightness and chrominance signals between successive frames. Further, when the difference between the signals at the input and output terminals of the frame delay 45 is derived by a subtracter 123, the chrominance signal 2C and the change of the brightness signal in one frame are obtained. Then the chrominance signal 2C is removed from the output signal of the subtracter 123 by a low pass filter 125. Therefore, the output signals from the subtracter 124 and low pass filter 125 represent the movement in picture. These signals are supplied to K generators 126 and 127, respectively. The K generators 126 and 127 have the characteristic shown in FIG. 13. That is to say, the K generators 126 and 127 generate movement coefficients K which become smaller when the movement becomes larger. The movement coefficients K thus generated are supplied to a selector 128 and the larger coefficient is selected as the movement coefficient $K_{M1}$. In this specification, the movement coefficient $K_{M1}$ is sometimes called the interframe movement coefficient. By utilizing the movement detecting method explained above, it is possible to obtain the movement coefficient $K_{M1}$ which complies with the actual movement in the picture.

By using the weight determined in accordance with the movement coefficient $K_{M1}$, the brightness and chrominance signals $Y_F$ and $C_F$ separated by the interframe separation method and the brightness and chrominance signals $Y_P$ and $C_P$ separated by the picture adaptive separation method are subjected to a weighted addition. This weighted addition is such that when the movement is large, the weight of the picture adaptive separation data $Y_P$, $C_P$ becomes large to decrease the deterioration of the image quality due to cross color, dot crawl and enhancement of vertical lines. Furthermore and when the movement is small, the weight of the interframe separation data $Y_F$, $C_F$ becomes large to improve the image quality, because in the interframe separation method the brightness and chrominance signals can be separated perfectly.

As shown in FIG. 5, the separated brightness signal Y is supplied a contour enhancer 55 to produce a contour enhanced brightness signal Y'. Then the brightness signal Y' and chrominance signal C are supplied to a color decoder 56 to produce three primary color signals R, G and B. These color signals R, G and B are then supplied to a movement adaptive line interpolator 57 to generate interpolated color signals R', G' and B'.

FIG. 14 is a schematic diagram for explaining the method of detecting movement in the picture. When the movement is detected by deriving a difference between successive frames,i.e., an I field and an (I-2) field, there may be a portion A in which the movement is detected and a portion B in which the movement is not detected. However, in the portion B, there may be movement within one frame, i.e. between the I field and the (I-1) field. In such a portion, the data in the previous field is interpolated as it is, so that there is produced an after image $P_{I-1}$ of the (I-1) field which does not exist in the I field. Therefore, it is necessary to avoid the occurrence of the portion B. In the present embodiment the movement adaptive line interpolation is carried out such that any undesired after image can be deleted.

Figure 15:
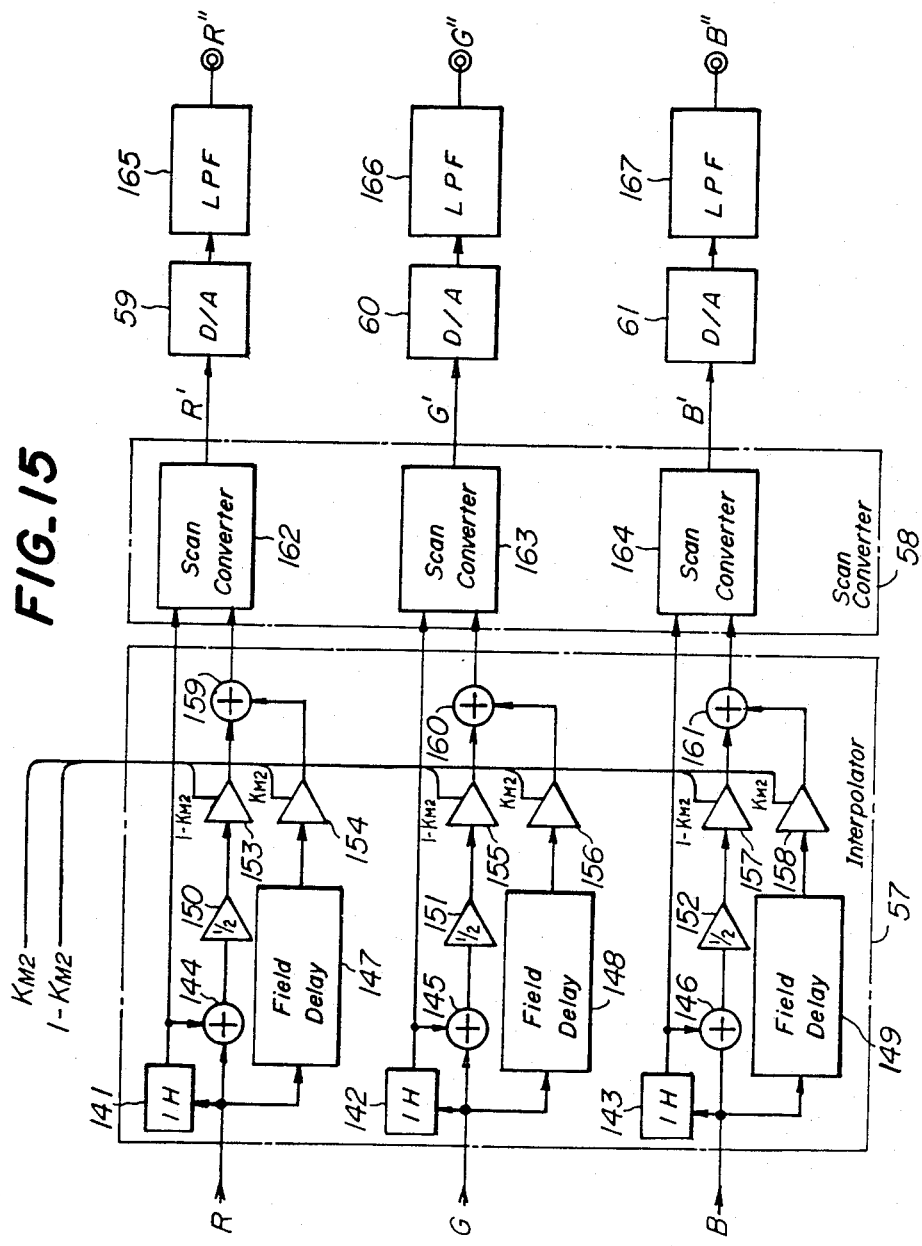
FIG. 15 is a block diagram illustrating the detailed construction of the movement adaptive line interpolator.

FIG. 15 illustrates the detailed construction of the movement adaptive line interpolator 57. The color signals R, G and B are supplied to respective interpolation circuits having the identical construction. The red color signal R is supplied to one-line (1H) delay 141, and the non-delayed and the 1H delayed signals are added to each other in an adder 144. The output signal from the adder 144 is divided by two by an amplifier 150. Then the amplifier 150 produces an average value between successive lines, i.e. bilinear data. The input signal R is also delayed by one field, i.e. 263H, by means of a one-field delay 147, and thus the data of a previous field appears at the output terminal of the one-field delay. The bilinear data and previous field data are supplied to multipliers 153 and 154, respectively to which are also supplied movement coefficients $(1-K_{M2})$ and $K_{M2}$, respectively. Products of the color signals and coefficients are added to each other by an adder 159. In this manner, the bilinear data and the previous field data are subjected to a weighted addition in accordance with the movement coefficient $K_{M2}$ such that when $K_{M2}$ becomes larger, the weight of the previous field data is increased and when $K_{M2}$ becomes smaller, the weight of the bilinear data is increased.

Next the manner of deriving the movement coefficient $K_{M2}$ will be explained with reference to FIG. 12. The interframe movement coefficient $K_{M1}$ selected by the selector 128 is passed through a series circuit of two one-field delays 129 and 130. Then signals appearing at the input terminal, middle point and output terminal of the series circuit are supplied to a selector 131 which selects the smallest value. In this manner, the movement is checked over three successive fields, so that the range of the movement detection is widened. In this specification, the thus-derived movement coefficient $K_{M2}$ is also termed the interfield movement coefficient. The fact that the selector 131 selects the smallest value among three values means that the largest movement is detected, as can be understood from the characteristic shown in FIG. 13. In this manner, detection of movement for a portion B can be avoided although movement exists within a frame. Since the smallest coefficient, corresponding to the largest movement, is selected, the weight of the bilinear data of the relevant field becomes larger.

As shown in FIG. 15 the interpolated signal from the adder 159 is supplied to a scan converter 162 together with the signal of the relevant field and these signals are converted into a non-interpolated signal having 525 lines per frame and 60 frames per second or an interlaced signal having 1050 lines per frame and 30 frames per second. The output color signal from the scan converter 162 is converted by a digital-analog converter 59, and the analog signal thus obtained is passed through a low pass filter 165 having a cut-off frequency of 24 MHz to derive an interpolated color signal R". The input green and blue signals G and B are processed by one-line delays 142, 143, adders 145, 146, one-field delays 148, 149, amplifiers 151, 152, multipliers 155, 156; 157, 158, adders 160, 161, scan converters 163, 164, D/A converters 60, 61 and low pass filters 166, 167 in entirely the same manner as that explained above for the red color signal R. In this manner, the interpolated color signals R", G" and B" are obtained.

As was explained above in detail, according to the invention, since the frequency bandwidth of the composite color television signal is extended by more than twice as compared with that of the known NTSC system, it is possible to realize a horizontal resolution of up to 750 lines, a vertical resolution of up to 400 lines, and improved color reproducibility, and such properties are sufficient for transmitting medical images in a reliable manner. Further, the television camera 4, monitor 10 and projector 11 may be realized by existing apparatuses used in the NTSC system and thus the transmission system can be realized economically.

The color television signal transmission system according to the invention can be advantageously used to transmit not only the medical images, but also various kinds of industrial and scientific images.

The present invention is not limited to the embodiment explained above, but many modifications and alternations may be conceived by those skilled in the art within the scope of the invention. That is to say, the color encoder and decoder/converter may be constructed in various ways so that a horizontal resolution of up to 750 lines and a vertical resolution up to 400 lines can be achieved.

What is claimed is:

1. A system for transmitting a movable picture via a color television signal, said system comprising:

at a transmitter end first means, responsive to red, green and blue input color signals, for generating a composite color television signal including a brightness signal modulated on a main carrier and having a frequency bandwidth of 8 to 15 MHz, and a chrominance signal modulated on a color subcarrier and having a frequency bandwidth of 1.8 to 3.5 MHz, said chrominance signal being interleaved with the brightness signal; and second means for transmitting the composite color television signal; and at a receiver end third means, responsive to the signal transmitted by the second means, for generating a received composite color television signal having a brightness component and a chrominance component;

fourth means for deriving from the received composite color television signal mutually separated first brightness and chrominance signals, the fourth means including an interframe brightness/chrominance separator;

fifth means for deriving from the received composite color television signal mutually separated second brightness and chrominance signals, the fifth means including a picture adaptive brightness/chrominance separator;

sixth means for deriving mutually separated further brightness and chrominance signals by adding said mutually separated first and second brightness and chrominance signals, respectively, in accordance with a weight determined by the movement of the picture;

seventh means for effecting contour enhancement of the further brightness signal to derive an enhanced brightness signal;

eight means for decoding the enhanced brightness signal and the further chrominance signal to derive red, green and blue color signals; and ninth means for generating interpolated signals to provide additional scanning lines by effecting movement adaptive line interpolation for the red, green and blue color signals, the movement adaptive line interpolation reducing spurious after images when there is movement of the picture.

2. A system according to claim 1, wherein said chrominance signal is composed of a color difference signal (R−Y) and a color difference signal (B−Y), and wherein the first means comprises means for modulating the color difference signals (R−Y) and (B−Y) in quadrative on the color subcarrier.

3. A system according to claim 2, wherein the brightness signal included in the composite color television signal to be transmitted has a frequency bandwidth of about 12 MHz, wherein the color difference signals (R−Y) and (B−Y) are provided in the form of double-sidebands having a frequency bandwidth of about 2.4 MHz, wherein the color subcarrier has a frequency of about 7.151223 MHz, and wherein the number of scanning lines per frame is set to 525, the number of frames per second is set to 30, and an interlace ratio of 2:1 is effected.

4. A system according to claim 1, wherein said sixth means comprises means for generating an interframe movement coefficient which increases when the movement of the picture decreases.

5. A system according to claim 4, wherein said means for generating an interframe movement coefficient comprises means for deriving a first difference in the brightness component of the received composite color television signal between successive frames, means for deriving a second difference in the brightness and chrominance components of the received composite color television signal between every other frame, means for generating first and second interframe movement coefficients corresponding to said first and second differences, and means for selecting the larger of the first and second interframe movement coefficients.

6. A system according to claim 1, wherein said picture adaptive brightness/chrominance separator comprises first means for filtering the received composite color television signal to provide a first filtered chrominance signal, the first filter means including a comb filter, second filter means for filtering the received composite color television signal to provide a second filtered chrominance signal, the second filter means including a band pass filter, means for generating image change coefficients derived from the picture contents, and means for subjecting the first and second filtered chrominance signals to weighted addition in accordance with the image change coefficients.

7. A system according to claim 6, wherein said means for generating an image change coefficient comprises means for deriving a vertical change signal and a lateral change signal for changes in the picture, means for deriving a vertical change coefficient which varies in accordance with said vertical change signal in a substantially inversely proportional manner, means for deriving a lateral change coefficient which varies in accordance with said lateral change signal in a substantially proportional manner, and means for comparing said vertical and lateral change coefficients with each other and selecting the larger as the image change coefficient.

8. A system according to claim 1, wherein said ninth means comprises means for deriving bilinear data in an I field, means for deriving data of an I-1 previous field, means for generating an interfield movement coefficient, and means for subjecting the bilinear data and the data of the I-1 previous field to a weighted addition in accordance with the interfield movement coefficient.

9. A system according to claim 8, wherein said means for generating an interfield movement coefficient comprises means for deriving a first difference in the brightness component of the received composite color television signal between successive frames; means for deriving a second difference in the brightness and chrominance components of the received composite color television signal between every other frame; means for generating first and second interframe movement coefficients corresponding to said first and second differences; means for selecting the larger of the first and second interframe movement coefficients as a final interframe movement coefficient; means including a pair of one field delay elements for delaying the final interframe movement coefficient to generate a non-delayed interframe movement and two interframe movement coefficients delayed by one and two fields, respectively; and means for selecting among these three interframe movement coefficients the largest interframe movement coefficient as an interfield movement coefficient.

10. A receiving apparatus for use in a color television system for transmitting a movable picture by converting red, green, and blue input signals into a composite color television signal which includes a brightness signal modulated on a main carrier and having a frequency bandwidth of 8 to 15 MHz and a chrominance signal modulated on a color subcarrier and having a frequency bandwidth of 1.8 to 3.5 MHz, the chrominance signal being interleaved with the brightness signal; and by transmitting the composite color television signal, said receiving apparatus comprising:

receiving means, responsive to the transmitted composite color television signal, for generating a received composite color television signal having a brightness component and a chrominance component;

first separating means, responsive to the received composite color television signal, for deriving brightness and chrominance signals $Y_F$ and $C_F$, the first separating means employing an interframe brightness and chrominance separation mode;

a second separating means, responsive to the received composite color television signal, for deriving brightness and chrominance signals $Y_P$ and $C_P$, the second separating means employing a picture adaptive brightness and chrominance separation mode;

generating means for generating an interframe movement coefficient representing the movement in a picture;

combining means for weighting the brightness signals $Y_F$ and $Y_P$ and the chrominance signals $C_F$ and $C_P$, in accordance with weighting factors which are derived from the interframe movement coefficient, to provide weighted brightness signals $Y_F$ and $Y_P$ and weighted chrominance signals $C_F$ and $C_P$, the combining means additionally including means for adding the weighted brightness signals $Y_F$ and $Y_P$ to provide a combined brightness signal and means for adding the weighted chrominance signals $C_F$ and $C_P$ to provide a combined chrominance signal;

enhancement means for effecting contour enhancement of the combined brightness signal to provide an enhanced brightness signal;

decoding means for decoding the enhanced brightness signal and the combined chrominance signal to provide red, green, and blue color signals; and interpolation means for generating interpolated signals to provide additional scanning lines by effecting movement adaptive line interpolation for the red, green, and blue color signals, the movement adaptive line interpolation reducing spurious after images when there is movement in the picture.

11. A receiving apparatus according to claim 10, wherein said second separating means comprises a comb filter, a band pass filter, a detector means for detecting a further movement coefficient, and a weighting circuit means adding output signals from said comb filter and band pass filter in accordance with weights related to the further movement coefficient.

12. A receiving apparatus according to claim 11, wherein said detector means comprises a means for deriving a vertical change in the picture contents, a vertical change coefficient generator means for generating a vertical change coefficient in accordance with said vertical change, a means for deriving a lateral change in the picture contents, a lateral change coefficient generator means for generating a lateral change coefficient in accordance with said lateral change, a comparator means for comparing the vertical and lateral change coefficients with each other, a selector means responsive to said comparator for selecting the larger change coefficient, and a movement coefficient generator means for generating the further movement coefficient in accordance with the larger change coefficient.

13. A receiving apparatus for use in a color television system for trnasmitting a movable picture by converting red, green, and blue input signals into a composite color television signal which includes a brightness signal modulated on a main carrier and having a frequency bandwidth of 8 to 15 MHz and a chrominance signal modulated on a color subcarrier and having a frequency bandwidth of 1.8 to 3.5 MHz, the chrominance signal being interleaved with the brightness signal, and by transmitting the composite color television signal, said receiving apparatus comprising:

receiving means, responsive to the transmitted composite color television signal, for generating a received composite color television signal having a brightness component and a chrominance component;

deriving means for deriving from the received composite color television signal mutually separated first brightness and chrominance signals, the deriving means including an interframe brightness/chrominance separator;

additional deriving means for deriving from the received composite color television signal mutually separated second brightness and chrominance signals, the additional deriving means including a picture adaptive brightness/chrominance separator;

further deriving means for deriving mutually separated further brightness and chrominance signals by adding the mutually separated first and second brightness and chrominance signals, respectively, in accordance with a weight determined by movement of the picture;

enhancement means for effecting contour enhancement of the further brightness signal to derive an enhanced brightness signal;

decoding means for decoding the enhanced brightness signal and the further chrominance signal to derive red, green, and blue color signals; and interpolation means for generating interpolated signals to provide additional scanning lines by effecting movement adaptive line interpolation for the red, green, and blue color signals, the movement adaptive line interpolation reducing spurious after images when there is movement in the picture, the interpolation means including a means for deriving a bilinear data in a field, means for deriving an interfield movement coefficient, and a means for effecting the movement adaptive line interpolation by adding said bilinear data and data in a previous field in accordance with a weight determined by said interfield movement coefficient.

14. A receiving apparatus according to claim 13, wherein said means for deriving an interfield movement coefficient comprises a means for deriving a first difference between a first frame and a second frame immediately prior to the first frame;

a means for deriving a second difference between the first frame and a third frame immediately prior to the second frame;

a first generator means for producing a first interframe movement coefficient in accordance with said first difference;

a second generator means for producing a second interframe movement coefficient in accordance with said second difference;

a comparator for comparing said first and second interframe movement coefficients with each other;

a first selector means for selecting the larger interframe movement coefficient among the first and second interframe movement coefficients as a final interframe movement coefficient;

a first delay means for delaying the final interframe movement coefficient for one field period to generate a one-field delayed interframe movement coefficient;

a second delay means for delaying said one-field delayed interframe movement coefficient for one field period to generate a two-field delayed interframe movement coefficient; and a second selector means for comparing the nondelayed, one-field delayed, and two-field delayed interframe movement coefficients and selecting the smallest interframe movement coefficient as an interfield movement coefficient.

* * * * *